E. C. WILCOX & C. CUNO.
SHOCK ABSORBER.
APPLICATION FILED JAN. 13, 1910.
982,914.
Patented Jan. 31, 1911.
2 SHEETS—SHEET 1.
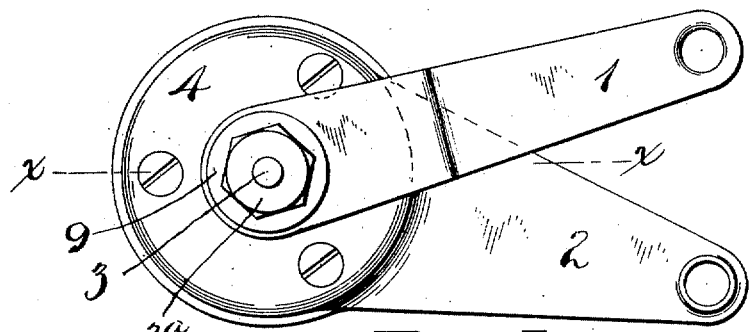
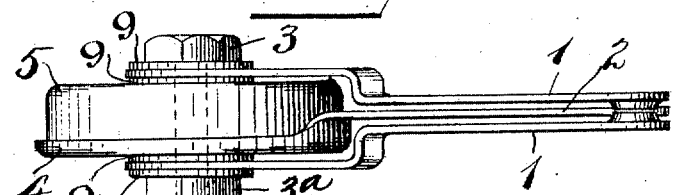
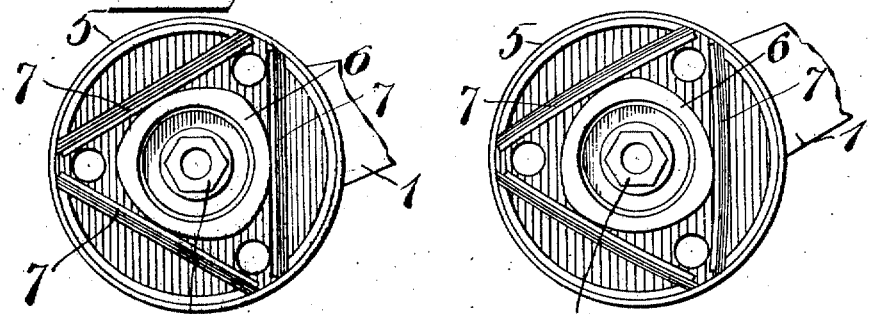
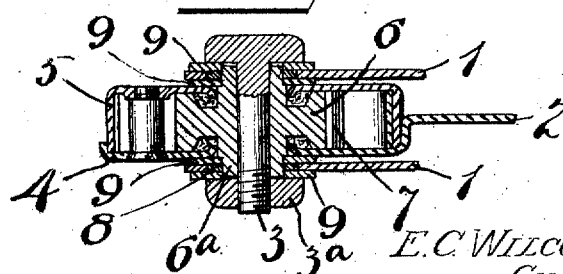
Witnesses:
Charles Peard
Fred M. Dannisfelser
E. C. Wilcox Inventor
Charles Cuno
By his Attorneys E. C. WILCOX & C. CUNO.
SHOCK ABSORBER.
APPLICATION FILED JAN. 13, 1910.
982,914.
Patented Jan. 31, 1911.
2 SHEETS—SHEET 2.
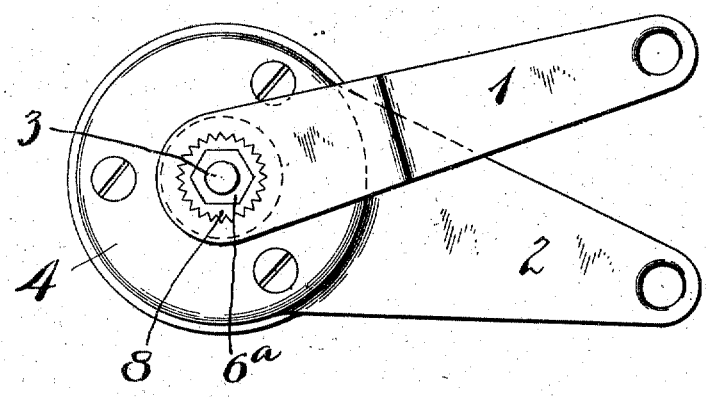
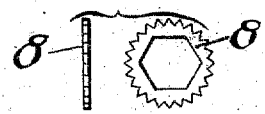
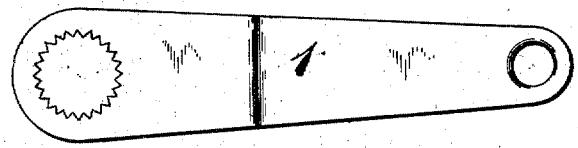
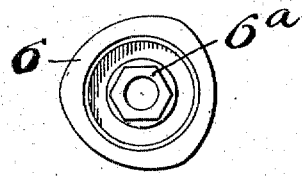
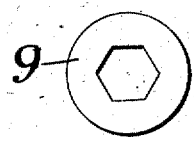
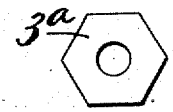

UNITED STATES PATENT OFFICE.

ERNEST C. WILCOX AND CHARLES CUNO, OF MERIDEN, CONNECTICUT.

SHOCK-ABSORBER.

982,914.        Specification of Letters Patent.      Patented Jan. 31, 1911.

Application filed January 13, 1910. Serial No. 537,837.

*To all whom it may concern:*

Be it known that we, ERNEST C. WILCOX and CHARLES CUNO, citizens of the United States, residing at Meriden, county of New Haven, State of Connecticut, have invented certain new and useful Improvements in Shock-Absorbers, of which the following is a full, clear, and exact description.

Our invention relates to improvements in shock absorbers.

The improvements herein claimed relate particularly to adjustment features whereby the apparatus may be adjusted to vehicles having different clearance between the two parts to which the shock absorber is connected, said adjustment feature also being capable of re-adjustment in the event of the sagging of the vehicle springs.

In the accompanying drawings, Figure 1 is a side elevation of our invention assembled in normal position for one adjustment. Fig. 2 is a plan view thereof. Fig. 3 is a detail view of the interior of the case and showing the various parts therein in one position. Fig. 4 is a similar view showing said parts in another position. Fig. 5 is a section on the line X—X, Fig. 1. Fig. 6 is a view similar to Fig. 1 with certain parts removed. Figs. 7 to 11 inclusive are detail views.

1—2 are lever elements or arms designed to be connected to the vehicle in any suitable manner. In the particular form shown, the arm 1 would be connected to the body of the vehicle, while the arm 2 would be connected to the axle, which parts (the body and axle) are connected by suitable load bearing springs. The arms 1—2 partake of a hinge movement on the axis of center bolt 3. The arm 2 is provided with a circular hollowed-out extension, which, in the present instance, constitutes the cap 4 of a circular box or case. The body of this box or case is indicated at 5, and provides within it a space for the shock absorbing and recoil arresting elements. 6 is a cam concentric to the axis of the bolt 3 and located within the case and having suitable bearings in said cap 4 and case 5.

7—7—7 are springs held within the case and bearing upon the cam. In this particular instance, three springs are employed, and the cam is provided with a corresponding number of high points, as shown, the high points of the cam 6 being normally located approximately midway between two adjacent springs where they contact with the low parts of the cam. In this type of an absorber, the cam normally assumes a neutral position such as shown in Fig. 3. In this neutral position a vehicle driven over an ordinary road will preferably have no appreciable action upon the absorber, or, to express it another way, the absorber under such conditions is preferably performing no work. When, however, a bad piece of road is encountered and the vehicle is severely jolted, the abnormal action of the vehicle springs, under such conditions, is supplemented by the action of the springs 7—7 which operate in a direction to arrest severe jolts and abnormal recoil. In Fig. 4, we have shown the position of the cam 6 as turned to such a degree as to flex the springs 7, as would occur when said shock absorber is supplementing the action of the vehicle springs.

The adjustable feature for this type of absorber (one having a neutral point) is preferably effected at the junction of the lever 1 with cam 6. The lever element 1 is preferably made of two parts, which straddle the case and cap 5—4 (see Fig. 2). One effective and simple means for securing this adjustment is illustrated and comprises a locking means whereby said arm 1 may be connected to the cam at various angles of adjustment relatively to the neutral position of the cam. To accomplish this result, the hub extension 6$^a$ of the cam 6 is angular or hexagonal. Fitting over this is a ring-like member 8 having serrations or irregularities at its outer edge, provided in a suitable number to afford the desired degree of adjustment, which, in order to be effective, must be such as to permit the arms 1 and 2 to be shifted relatively to each other a few degrees. This is due to the fact that the length of the arms is such that a very few degrees difference in adjustment will shift the ends of the arms 1—2 to a very material extent. One of the arms, in this instance arm 1, is provided with an opening arranged to snugly fit the serrated outer edge of the ring 8 (see Figs. 7 and 8). The thickness of the ring 8 corresponds substantially to the thickness of the metal of the arm 1.

9—9 are washers arranged to stand on opposite sides of the ring 8 and arm 1 when the parts are assembled, serving to prevent lateral dislodgment of said parts when the parts are in operation, angular displacement being prevented by the interlocking serrations or irregularities between the parts thus far described. To finally connect the parts, a nut 3ᵃ is screwed on to the center bolt 3, clamping all parts securely in position. As shown, the angular part of the hub 6ᵃ is somewhat reduced so as to provide a shoulder against which the inside washer 9 will abut, whereby, when the bolt 3 and nut 3ᵃ are tightened up, said inside washer will not bind frictionally upon the case 4 to such a degree as to influence the action of the lever 1. This shoulder shown in Fig. 9 we will refer to herein as a stop shoulder. It is obvious that it would be preferable, and indeed, it is our intention in said preferable form of the construction to provide an interlocking means such, for example, as the ring 8 between both members of the lever element or arm 1 where said members engage the opposite ends or hub portion of the cam 6.

What we claim is:

1. In a shock absorber, resistance mechanism including a spring, an oscillating device operating against said spring with increasing and diminishing force depending upon the direction of movement of the former relatively to the latter, a lever arm connected to the spring, another lever arm connected to said oscillating member, an adjustable connection between one of said arms and its respective part whereby said part may be angularly adjusted relatively thereto, said connection including an angular hub, a stop shoulder thereon, an annular plate-like member fitted thereon and angularly adjustable thereon, the external periphery of said plate being serrated, a passage through said lever arm corresponding to and arranged to fit upon the serrated outer edge of said plate, said plate and the lever arm mounted thereon being of substantially the same thickness, a covering washer adapted to fit upon said angular hub and overstanding the line of connection between said plate and lever arm, a bolt passing through said oscillating member, and a nut adapted to said bolt and arranged to hold all of said parts in assembled position.

2. In a shock absorber, resistance mechanism including a spring, an oscillating device operating against said spring with increasing and diminishing force depending upon the direction of movement of the former relatively to the latter, a lever arm connected to the spring, another lever arm connected to said oscillating member, an adjustable connection between one of said arms and said oscillating member whereby said arm may be angularly adjusted relatively thereto, said connection including an angular hub, a stop shoulder thereon, an annular plate-like member fitted thereon and angularly adjustable thereon, the external periphery of said plate being serrated, a passage through said lever arm corresponding to and arranged to fit upon the serrated outer edge of said plate, said plate and arm being of substantially the same thickness, a covering washer adapted to fit upon said angular hub and overstanding the line of connection between said plate and lever arm, and another washer between said lever arm and said stop shoulder, a bolt passing through said oscillating member, and a nut adapted to said bolt and arranged to hold all of said parts in assembled position.

ERNEST C. WILCOX.
CHARLES CUNO.

Witnesses:
L. T. FULLER,
V. M. KOOREMAN.